United States Patent
Kapaan et al.

(10) Patent No.: US 6,719,103 B1
(45) Date of Patent: Apr. 13, 2004

(54) ACTUATOR WITH MISALIGNMENT COMPENSATION

(75) Inventors: Hendrikus Jan Kapaan, Nieuwegein (NL); Thomas Fucks, Aachen (DE); Jiri Gurka, Behamberg (AT); Jérôme Dubus, La Motte Servolex (FR)

(73) Assignee: SKF Engineering and Research, Nieuwegein (NL)

( * ) Notice: Subject to any disclaimer, the term of this patent is extended or adjusted under 35 U.S.C. 154(b) by 0 days.

(21) Appl. No.: 10/129,732
(22) PCT Filed: Nov. 23, 2000
(86) PCT No.: PCT/NL00/00855
§ 371 (c)(1), (2), (4) Date: May 24, 2002
(87) PCT Pub. No.: WO01/38750
PCT Pub. Date: May 31, 2001

(30) Foreign Application Priority Data

Nov. 23, 1999 (NL) .............................................. 1013651

(51) Int. Cl.[7] .............................................. F16D 65/21
(52) U.S. Cl. .................. 188/72.8; 188/162; 310/12
(58) Field of Search ................ 188/72.7, 72.8, 188/73.41, 156, 157, 158, 161, 162; 310/12, 13, 14, 91

(56) References Cited

U.S. PATENT DOCUMENTS

| 4,852,699 A | * | 8/1989 | Karnopp et al. ............. 188/162 |
| 5,644,180 A | * | 7/1997 | Buchanan, Jr. .............. 310/91 |
| 5,829,557 A | | 11/1998 | Halasy-Wimmer et al. |

FOREIGN PATENT DOCUMENTS

| DE | 198 53 721 A1 | 6/1999 |
| DE | 198 03 341 A1 | 8/1999 |
| JP | 08-30290 A | * 11/1996 |

* cited by examiner

Primary Examiner—Jack Lavinder
Assistant Examiner—Thomas J. Williams
(74) Attorney, Agent, or Firm—Oliff & Berridge, PLC

(57) ABSTRACT

An actuator (5) comprises a housing (4) with a motor (6) and a screw mechanism (9), said screw mechanism comprising nut (10) and a screw (11) one of which is rotatably supported with respect to the housing by means of a screw mechanism support (13) allowing relative rotations of the screw and the nut with respect to the longitudinal screw mechanism axis (28), and an actuating member (15) connected to the screw mechanism by means of an actuating member connection (26), such that on relative rotation of the nut and screw the actuating member is displaced with respect to the housing. The screw mechanism support and the actuating member connection allow rotations having at least one axis transverse with respect to the longitudinal screw mechanism axis, so as to compensate traverse loading and bending moments.

19 Claims, 1 Drawing Sheet

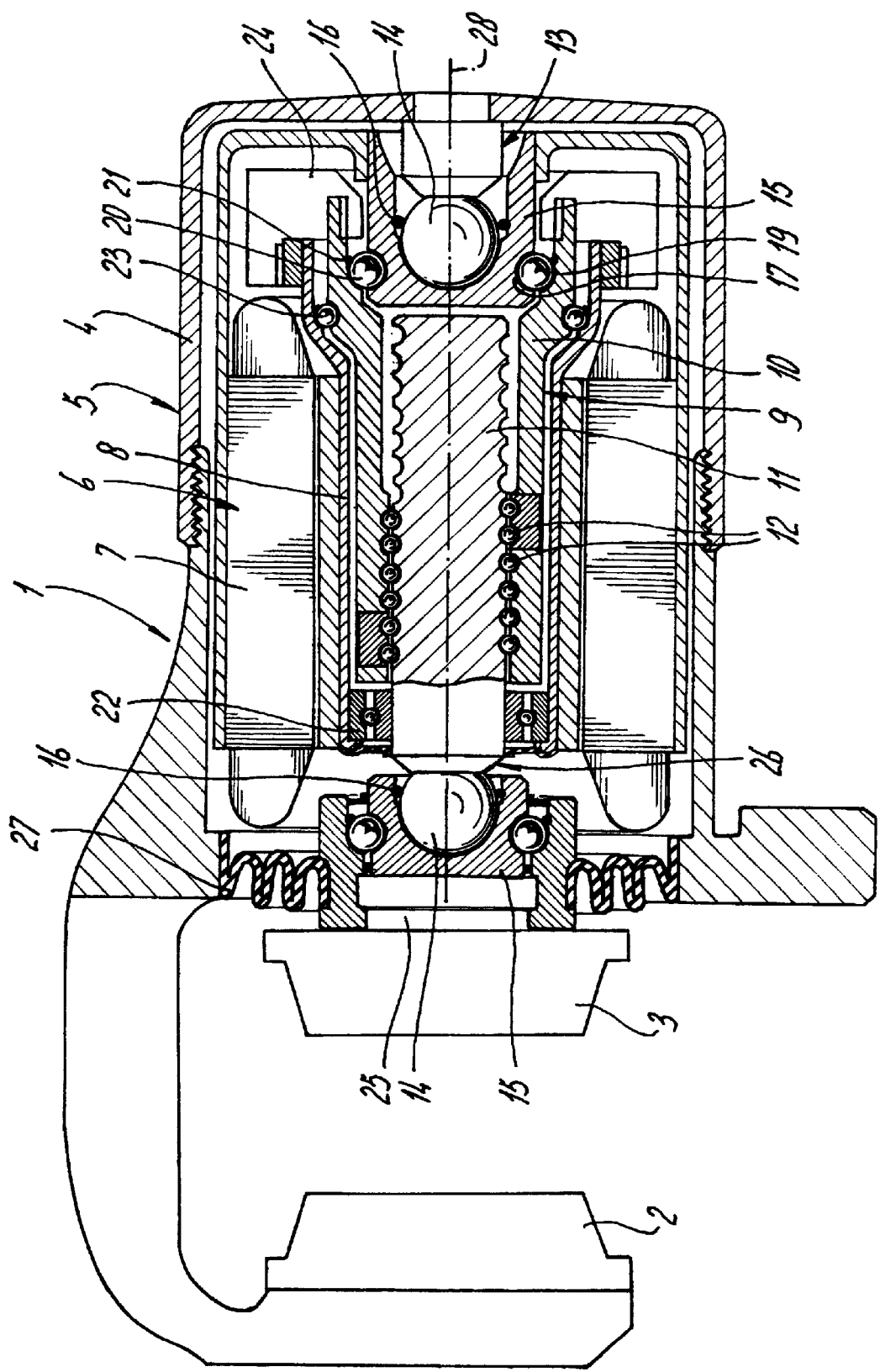

ACTUATOR WITH MISALIGNMENT COMPENSATION

The invention is related to an actuator, comprising a housing with a motor and a screw mechanism, said screw mechanism comprising a nut and a screw one of which is rotatably supported with respect to the housing by means of a screw mechanism support allowing relative rotation of the screw and the nut with respect to the longitudinal screw mechanism axis, and an actuating member connected to the screw mechanism by means of an actuating member connection, such that on relative rotation of the nut and screw the actuating member is displaced linearly with respect to the housing.

Such actuator is known. The motor, which can be electric, hydraulic etc., rotates either the nut or screw which in turn imparts a translational movement to the other thereof. As an alternative, the nut or screw may be fixed completely, the other in that case carrying out both a rotational and a translational movement.

The nut and screw are each provided with screw threads which, in the most simple embodiment, are in direct engagement. In order however to reduce the internal friction of the screw actuator, often the screw and nut engage each other through balls or grooved rollers which are accommodated in the correspondingly shaped screw threads of nut and screw.

The latter embodiment in particular provides a high efficiency, leading to reduced power consumption. Moreover, the load capacity with respect to linear loads is excellent. However, ball or roller screw mechanisms are rather vulnerable to deviating loadings such as transverse loadings.

The object of the invention is to provide an actuator of the type referred to before, which does not have this drawback of vulnerability with respect to transverse loadings. This object is achieved in that the screw mechanism support and the actuating member connection allow rotations having at least one axis transverse with respect to the longitudinal screw mechanism axis (swivelling motions).

As the screw mechanism at both ends is now loaded through connections allowing transverse rotations, any bending moments and transverse loadings are reduced or even completely absent.

The screw mechanism support may comprise a ball swivel with transmission splines which do not allow rotations with respect to the longitudinal axis of the actuator. Such ball swivel may be carried out in analogy with a homokinetic joint. In this sense, the screw mechanism support is stiff with respect to rotations around said longitudinal axis in order to (quasi-) immobilize the stator of the motor against rotating.

In case also the motor is supported with respect to the housing through the screw mechanism support, the transmission between the motor and the screw mechanism is not exposed to relative movements. Thus, in case the motor engages the screw mechanism through a gear reduction, no specially shaped gears are necessary.

In the alternative, the motor may be fixed with respect to the housing. In that case, relative transverse rotations may occur between the motor and the screw mechanism, which necessitate the application of specially rounded gears or the application of a special coupling.

The screw mechanism support and the actuating member connection may comprise ball swivels with or without transmission splines. Such ball swivels do allow transverse rotations in any direction.

Preferably, the nut is connected to or integrated with the outer ring of a screw mechanism support bearing, the inner ring of which being connected to or integrated with the ball swivel. Also, the screw may be connected to or integrated with a ball swivel which is in turn connected to or integrated with the actuating member.

The actuating member is laterally guided with respect to the housing so as to limit the transverse rotations and movements of the screw mechanism. This guidance can be obtained by e.g. laterally extending spring means 27, or by accommodating the actuating member in a bore or slit etc.

The invention is also related to a brake calliper for a disc brake, comprising a calliper housing which supports at least two opposite brake pads between which a brake disc can be accommodated, and an actuator as referred to before, said actuator comprising a housing with a motor and a screw mechanism, said screw mechanism comprising a nut and a screw one of which is rotatably supported with respect to the housing by means of a screw mechanism support allowing relative rotations of the screw and the nut with respect to the longitudinal screw mechanism axis, and an actuating member connected to the screw mechanism by means of an actuating member connection, such that on relative rotation of the nut and screw the actuating member is displaced linearly with respect to the housing.

According to the invention, the screw mechanism support and the actuating member connection allow rotations having at least one axis transverse with respect to the longitudinal screw mechanism axis 28 (swivelling motions).

The actuating member is accommodated in an opening or bore etc. in a transverse wall of the brake calliper housing or fixed directly to the brake pad, said actuating member extending through said opening and carrying a brake pad at its protruding end. Thus, (under misaligned brake forces) the movements of the actuating member, and thereby of the actuator can remain within acceptable limits.

The invention will be described further with reference to an embodiment of a brake calliper comprising an actuator according to the invention.

The FIGURE shows a brake calliper for a disk brake. The brake calliper has a calliper housing 1 which carries two brake pads 2, To the calliper housing 1, the actuator housing 4 of the screw actuator 5 is mounted. The actuator 5 comprises an electric motor 6, having a stator 7 connected to the actuator housing 4, and a rotor 8.

Furthermore, the screw actuator 5 comprises a screw mechanism 9 consisting of a nut 10 and a screw 11. The nut 10 and the screw 11 have screw threads which engage each other through balls 12.

The screw mechanism 9 is supported with respect to the actuator housing 4 by means of a screw mechanism support ball swivel 13 with splines to allow drive relative to the screw, and to immobilize the stator 7 with respect to the housing. This splined ball swivel 13 comprises a ball 14, accommodated within a cap 15 and locked by means of a wire 16. The cap 15 comprises an integrated, inner raceway 17 of the support bearing 18 for rotatably supporting the nut 10 with respect to the actuator housing 4.

The nut itself carries an integrated outer raceway 19, and the balls 20 are held captive by means of the wire 21 of the support bearing 18.

The rotor 8 is connected to the nut 10 through a gear reduction mechanism 24. The rotor 8 may maintain a separation from the screw mechanism with balls 23 and raceways 22.

The screw 11 is connected to an actuating member 25 through an actuating member connection ball swivel 26. Said ball swivel 26 also comprises a ball 14 which is accommodated in its corresponding recess in the cap 15, and which is held captive by means of the wire 16.

The cap 15 is accommodated within said actuating member 25, which actuating member 25 is either fixed directly to the brake pad 3 which is centered and slidably supported in the brake calliper or is acting as a piston and slidably supported in a bore of the brake calliper.

Upon actuating the actuator 5, the brake pads 2, 3 are displaced towards each other and thereby exert a friction on the brake disk (not shown). Under braking conditions, the brake pads 2, 3 have the tendency to displace somewhat together in the direction of the rotational movement of the brake disk. Any transverse movements which might be experienced by the actuating member 25, are now compensated by the ball swivels 13, 26. Thus, the nut 10, screw 11 and balls 12 and 23 are not exposed to transverse forces.

Finally the screw mechanism may comprise an integrated lubricant dosing module. A sensor may be provided for detecting a rotational or translation movement.

What is claimed is:

1. Actuator (5), comprising a housing (4) with a motor (6) and a screw mechanism (9), said screw mechanism (9) comprising a nut (10) and a screw (11) one of which is rotatably supported with respect to the housing (4) by means of a screw mechanism support (13) allowing relative rotations of the screw (11) and the nut (10) with respect to the longitudinal screw mechanism axis (28), and an actuating member (15), connected to the screw mechanism (9) by means of an actuating member connection (26), such that on relative rotation of the nut (10) and screw (11) the actuating member (15) is linearly displaced with respect to the housing (4), characterised in that the screw mechanism support (13) and the actuating member connection (26) comprises ball swivels (14, 15) having at least one rotation axis transverse with respect to the longitudinal screw mechanism axis (28), and in that the motor (6) is supported with respect to the housing (4) through the screw mechanism support (13), said ball swivel (14) of the screw mechanism support (13) comprising a ball (14) and a cap (15) accommodating said ball (14), said cap (15) supporting the nut (10) rotatably through a support bearing.

2. Actuator according to claim 1, wherein the rotor (8) of the motor (6) is rotatably supported on the nut (10) which is rotatably supported with respect to the longitudinal screw mechanism axis (28).

3. Actuator according to claim 1, wherein the motor (6) engages the screw mechanism (9) through a gear reduction (24).

4. Actuator according to claim 1, wherein the ball swivel (14, 15) comprises a groove/spline transmission for preventing axial rotation, or a homokinetic joint.

5. Actuator according to claim 4, wherein the nut (10) is connected to or integrated with the outer ring (19) of a screw mechanism support bearing (18), the inner ring (17) of which being connected to or integrated with the ball swivel (14, 15).

6. Actuator according to claim 4, wherein the screw (11) is connected to or integrated with a ball swivel (14, 15) which is in turn connected to or integrated with the actuating member (25).

7. Actuator according to claim 1, wherein the actuating member (25) is laterally guided with respect to the housing (5).

8. Actuator according to claim 7, wherein the actuating member (25) is connected to the housing by a laterally extending spring means (27).

9. Actuator according to claim 8, wherein the actuating member (25) is a sliding piston.

10. Actuator according to claim 8, wherein the actuating member is accommodated in a bore or slit in the housing.

11. Actuator according to claim 1, wherein the screw is a ball or roller screw.

12. Actuator according to claim 1, wherein the screw mechanism comprises an integrated lubricant dosing module.

13. Actuator according to claim 1, wherein a sensor is provided for detecting a rotational or translational movement.

14. Brake caliper for a disc brake, comprising a caliper housing (1) which supports at least two opposite brake pads (2, 3) between which a brake disc can be accommodated, and an actuator (5) said actuator comprising a housing (4) with a motor (6) and a screw mechanism (9), said screw mechanism (9) comprising a nut (10) and a screw (11) one of which is rotatably supported with respect to the housing (4) by means of a screw mechanism support (13) allowing relative rotations of the screw (11) and the nut (10) with respect to the longitudinal screw mechanism axis (28), and an actuating member (15) connected to the screw mechanism (9) by means of an actuating member connection (26), such that on relative rotation of the nut (10) and screw (11) the actuating member (15) is displaced with respect to the housing (4), characterised in that the screw mechanism support (13) and the actuating member connection (26) comprises ball swivels (14, 15) having at least one rotation axis transverse with respect to the longitudinal screw mechanism axis (28), and in that the motor (6) is supported with respect to the housing (4) through the screw mechanism support, said ball swivel (14) of the screw mechanism support (13) comprising a ball (14) and a cap (15) accommodating said ball (14) said cap (15) supporting the nut (10) rotatably through a support bearing.

15. Brake calliper according to claim 14, wherein the actuating member is directly connected to the brake pad.

16. Brake calliper according to claim 15, wherein the actuating member is a sliding piston accommodated in a bore of the calliper.

17. Brake calliper according to claim 16, wherein the actuating member (25) is accommodated in an opening in a transverse wall of the brake calliper housing, said actuating member extending through said opening and carrying a brake pad at its protruding end.

18. Brake calliper according to claim 17, wherein the opening is generally as wide as the actuating member, when seen in the direction of the friction forces exerted on the brake pad during a braking action.

19. Brake calliper according to claim 14, wherein at least one of the components of the actuator consists of a powder metal.

* * * * *